(No Model.)
W. CHATTAWAY.
DRILL CHUCK.
No. 575,876. Patented Jan. 26, 1897.
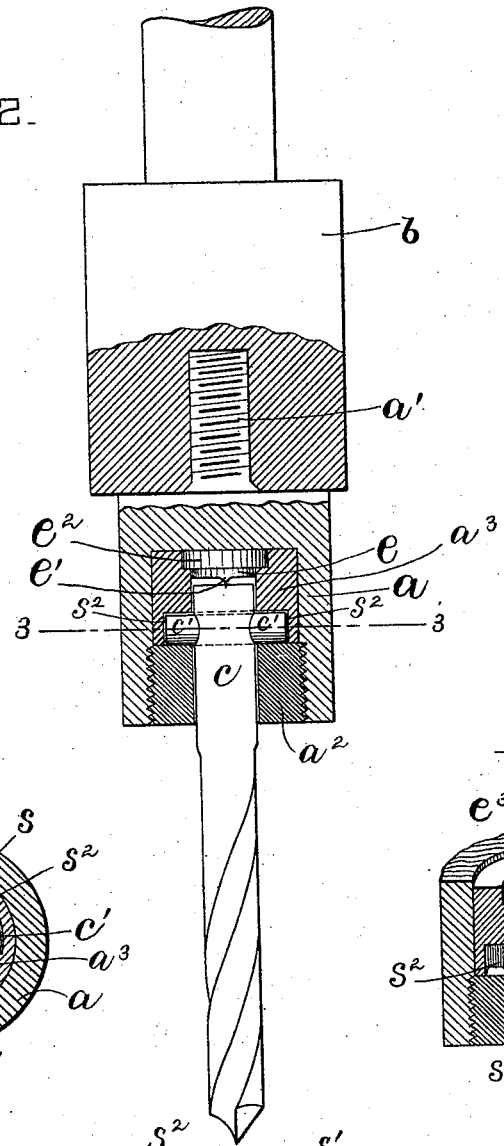
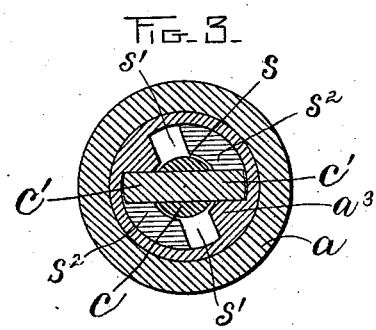
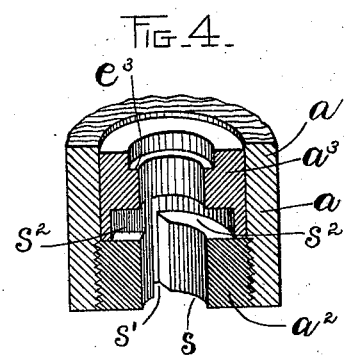
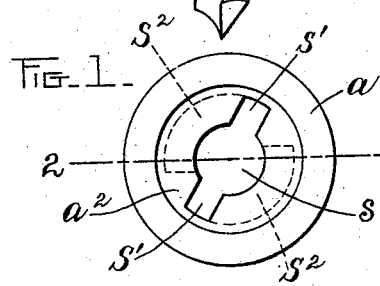
WITNESSES:
A. D. Harrison
P. W. Pezzetti
INVENTOR
Wm Chattaway
by Wright Brown & Quinby
attys
THE NORRIS PETERS CO., PHOTO-LITHO., WASHINGTON, D. C.

UNITED STATES PATENT OFFICE.

WILLIAM CHATTAWAY, OF WEST BROMWICH, ENGLAND, ASSIGNOR TO THE BOSTON FORGE COMPANY, OF BOSTON, MASSACHUSETTS.

DRILL-CHUCK.

SPECIFICATION forming part of Letters Patent No. 575,876, dated January 26, 1897.

Application filed June 11, 1896. Serial No. 595,173. (No model.) Patented in England August 3, 1893, No. 14,880.

*To all whom it may concern:*

Be it known that I, WILLIAM CHATTAWAY, of Henry Street, West Bromwich, in the county of Stafford, England, have invented certain new and useful Improvements in Drill-Chucks, (for which Letters Patent have been granted in Great Britain, No. 14,880, dated August 3, 1893,) of which the following is a specification.

This invention has for its object to enable a drill to be easily and quickly applied to and removed from a chuck which holds and rotates it without necessarily stopping the chuck; also to enable the drill to be loosely fitted in the chuck, or, in other words, made smaller than the hole or cavity formed to receive it in the chuck.

The invention consists in the improvements which I will now proceed to describe and claim.

Of the accompanying drawings, forming a part of this specification, Figure 1 represents an end view of a drill-chuck embodying my invention. Fig. 2 represents a section on line 2 2 of Fig. 1. Fig. 3 represents a section on line 3 3 of Fig. 2. Fig. 4 represents a perspective sectional view of a portion of the chuck.

The same letters of reference indicate the same parts in all the figures.

In the drawings, $a$ represents the main portion or body of a drill-chuck, which is preferably of cylindrical external form and provided with suitable means, such as a screw-threaded shank $a'$, for attachment to the rotary spindle $b$, which rotates the chuck, said spindle being provided with a screw-threaded socket to receive the shank $a'$. I do not limit myself, however, to this manner of connecting the chuck and spindle, as any other suitable means may be employed.

The chuck-body $a$ is provided with a cylindrical cavity extending from its outer end partly to its inner end, said cavity being considerably larger than the diameter of the shank of the drill $c$, which is held and rotated by the chuck. Within the said cavity are fitted two annular sections $a^2 a^3$, the inner walls of which form the socket $s$, which receives the shank of the drill $c$, said sections being placed end to end within the body of the chuck, as shown in Figs. 2 and 4. The outer section $a^2$ is externally screw-threaded and engaged with a corresponding internal thread formed on the wall of the cavity in the chuck-body, the section $a^2$ being thus detachably secured to the chuck-body and caused to retain therein the section $a^3$, which has a snug fit in the cavity of the chuck-body, but is not positively secured thereto, so that when the section $a^2$ is disengaged from the chuck-body the section $a^3$ may be dropped therefrom. The section $a^2$ is provided with longitudinal grooves $s' s'$, communicating with the socket $s$ and extending from end to end of the said section. The section $a^3$ is provided at its outer portion with segmental grooves $s^2 s^2$, each of which communicates at one end with one of the grooves $s'$ and is arranged at a right angle thereto, so that each longitudinal groove $s'$ and the segmental groove $s^2$ with which it communicates forms an angular groove in the wall of the socket $s$, as shown in Fig. 4.

The shank of the drill $c$ is provided with positively-projecting transverse studs $c' c'$, which are formed to pass through the longitudinal grooves $s'$ and to enter the segmental grooves $s^2$.

From the foregoing it will be seen that the drill may be engaged with the chuck by inserting the shank of the drill in the socket $s$ in such position that the studs $c'$ will enter the longitudinal grooves $s'$ and then moving the drill inwardly until the studs reach the segmental grooves $s^2$ and then giving the drill a partial rotation until the studs reach the inner ends of the segmental grooves $s^2$ and are out of line with the grooves $s'$, as shown in Fig. 3, the studs being then supported by the section $a^2$, so that the drill cannot drop from the chuck, as shown in Fig. 2.

$e$ represents a drill-centering step which is located at the inner end of the socket $s$ and has a pointed projection or pivot $e'$, which is located at the center of the socket and projects into the same, as shown in Fig. 2. The step $e$ is a disk formed with a shoulder $e^2$, which is engaged with a recess $e^3$, formed in the inner end of the section $a^3$, the step being therefore held in place by the sections $a^3$ and $a^2$. The step may be secured in any other suitable way, however, and may be affixed to the body of the chuck.

The drill-shank is preferably provided with a slight depression to receive the projection or pivot $e'$, said depression being located at the axial center of the drill. The centering-step keeps the drill true and the machine steady, and also causes the drill to center itself as soon as any pressure comes on the point of the drill. A great advantage is thus gained over all other chucks, as any drill can be instantaneously removed and another substituted for it without stopping the machinery.

In cases where numerous small drills are used the amount of time saved by my improvement is very great. In all chucks at present in use when the drill is fixed, unless the shank of the drill is turned perfectly true and straight, the socket in the chuck is apt to get out of shape and to lose its original accuracy of form, wabbling of the drill being the result. In this improved chuck, however, the fact that the drill is a little out makes no difference, as in all cases the drill is much smaller than the hole in the chuck, so that a perfectly true hole is formed in the work. On account of the looseness of the drill the machine is released from considerable wear, especially in radial-drill machines.

It will be seen that the outer ends of the longitudinal grooves $s'$ are always open or unobstructed, so that the lugs on a drill-shank may be readily inserted at any time without stopping the rotation of the chuck.

I claim—

A drill-chuck comprising a body or holder having a cylindrical cavity screw-threaded at its outer portion, and two annular sections constituting a drill-socket in said cavity, the inner section having segmental grooves or recesses in its outer portion, while the outer section is screw-threaded to engage the thread of the holder and is provided with longitudinal grooves which communicate with the segmental grooves in the inner section.

In testimony whereof I have signed my name to this specification, in the presence of two subscribing witnesses, this 27th day of May, A. D. 1896.

WILLIAM CHATTAWAY.

Witnesses:
MOSES MCILWAIN,
P. WILLIS.